(12) United States Patent
Stanford et al.

(10) Patent No.: US 6,273,921 B1
(45) Date of Patent: Aug. 14, 2001

(54) BATTERY FABRICATION METHOD USING SUPERCRITICAL CARBON DIOXIDE

(75) Inventors: Thomas B. Stanford, Port Hueneme; John D. Margerum, Woodland Hills; Willis H. Smith, Jr., Newbury Park, all of CA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/274,463

(22) Filed: Mar. 22, 1999

(51) Int. Cl.[7] ............................................. H01M 10/38
(52) U.S. Cl. ............................. 29/623.1; 134/95.2
(58) Field of Search ...................... 29/623.1; 134/95.2

(56) References Cited

U.S. PATENT DOCUMENTS

| | | | |
|---|---|---|---|
| 5,013,366 | * | 5/1991 | Jackson et al. . |
| 5,928,391 | * | 7/1999 | Lewin ................................ 29/623.5 |
| 5,961,671 | * | 10/1999 | Guindy et al. ...................... 29/623.1 |

* cited by examiner

Primary Examiner—John S. Maples

(57) ABSTRACT

A method for making batteries wherein the extraction step includes extracting plasticizer using phase shifting of supercritical carbon dioxide. In addition, contacting the extracting cells with pressurized carbon dioxide throughout the fabrication process encourages the formation of a solid electrolyte interphase layer.

8 Claims, 3 Drawing Sheets

BATTERY FABRICATION METHOD USING SUPERCRITICAL CARBON DIOXIDE

TECHNICAL FIELD

The present invention relates to a plastic lithium ion battery fabrication, and more particularly, to improvements regarding the extraction of contaminants and plasticizers.

BACKGROUND ART

Lithium ion batteries provide a substantial advantage over current energy storage technology and are being developed for use in, for example, communication satellite systems, portable electronics, and electric vehicles. The use of plastic lithium ion batters (PLIB), however, can eliminate up to 500 pounds per satellite resulting in a significant cost savings and longer satellite life. The fabrication process for PLIB is a complex and lengthy procedure involving numerous stages and steps in the production cycle, each consisting of multiple, critical, and often complicated procedures.

The fabrication process for a PLIB requires the removal of plasticizers from the separator, and also from the anode and cathode, of each battery cell prior to impregnation with an electrolyte. Plasticizers may be extracted using traditional condensed solvents such as hexane, 1, 1, 1 trichloroethane, methanol, or diethyl ether, followed by several critical steps, including a rigorous drying step, to remove and avoid the uptake of water vapor or other contaminants in the extracted cell. Often, the process is individually performed on each thin layer unit cell or bicell because of the need to ensure that each cell is properly carried through the critical steps mentioned. Extraction may be performed simultaneously on a larger group of thin layer cells or bicells, but care must be taken to ensure adequate flow around each cell or bicell to ensue the required high efficiency of plasticizer and contaminant removal. The series of steps in known PLIB processes contributes to a labor intensive manufacturing process which, depending on the performance requirements of the battery, may require 20–100 or more individual unit cells or bicells stacked together for a higher energy battery cell. Also, the extraction of stacks of multiple unit cells or bicells using traditional solvents is difficult due to limited access to and migration of the extraction solvents from the cell interior. Thicker organic solvents because of their higher viscosity and lower diffusivity, have poorer mass transport properties through the porous cell structure than available with a supercritical fluid (SCF).

The use of organic extraction solvents is also under scrutiny due to problems with air pollution and ozone depletion. Finally, processes incorporating traditional solvents are not readily upgraded to multiple cell extractions and require extended extraction periods.

Following plasticizer removal and drying, contact of the extracted preform with moisture must be avoided because at this point in the manufacturing process, the anode, cathode, and separator materials are particularly vulnerable to water absorption, which adversely affects subsequent activation and final cell performance. Hours of vacuum drying at elevated temperatures is necessary to adequately remove the residual water. Therefore, the extracted cell is thoroughly dried under high vacuum and then transferred to a "dry box" where the electrolyte is introduced. The drying step is difficult and time consuming and contributes to a more complex manufacturing process, especially when processing stacks of multiple unit cells or bicells.

After drying, unit cells or bicells are currently impregnated with an electrolyte by adding a measured aliquot of electrolyte to each cell, manually massaging the cell to promote uniform absorption, followed by drying the cell with absorbent paper to remove excess electrolyte. This procedure must be performed in a "dry box," and is awkward, cumbersome and difficult to accomplish.

There are several known methods of lithium ion battery fabrication, and extraction and cleaning methods. For example, U.S. Pat. No. 5,540,741 to Gozdz et al. discloses a method making a unit cell or bicell battery. The method includes anode, cathode, and separator forming steps, as well as an extraction step to remove the bulk of the plasticizers from the anode, cathode, and separator layers of the unit cell. The plasticizer/contaminant extraction step preferably utilizes a liquid solvent. An alternative extraction method for single cells is disclosed using supercritical fluids such as carbon dioxide, propane, or nitrous oxide at temperatures above their respective critical points. At supercritical temperatures, the liquid and gas phases cease to separately coexist, resulting in the formation of a single phase. Additionally, the use of entrainers or cosolvents is disclosed, particularly with the use of carbon dioxide in supercritical fluid extraction (SFE). Although SFE is generally known as a potential method, Gozdz does not specifically teach a viable method of SFE in conjunction with battery fabrication.

Also, U.S. Pat. No. 5,013,366 to Jackson et al. discloses a cleaning process for removing two or more contaminants using temperature variable phase shifting of dense gas phases.

Accordingly, there is a present need to simplify manufacturing of PLIBs to eliminate the environmental risks and liabilities attendant in the use of traditional extraction solvents, and to shorten the extraction periods and also provide for multiple cell extraction.

SUMMARY OF THE INVENTION

The aforementioned problems are solved by an extraction method combining liquid and supercritical fluid extraction and dense gas phase changing between the liquid and supercritical states. The physical and chemical properties of supercritical fluids, notably supercritical carbon dioxide ($SCCO_2$) are used not only as an alternative to traditional condensed organic solvent extraction, but also to afford processing advantages which greatly reduce the labor, complexity and effort required in battery cell fabrication.

A dense phase gas is a gas compressed to supercritical conditions to achieve liquid-like densities. These dense phase gases or gas mixtures are also referred to as supercritical fluids (SCFs). Unlike organic solvents, supercritical fluids exhibit unique physical and chemical properties such as high diffusivity, low surface tension, low viscosity, and variable solute carrying capacity. Pressure induced phase shifting is used in this invention to cause a flow of $CO_2$ fluid in and out of the battery cell layers from which the plasticizer is being extracted, thereby increasing the efficiency of the extraction process.

The same properties that make $SCCO_2$ a good replacement for condensed solvents also afford secondary benefits. Processing using $SCCO_2$ precludes the deleterious effects of oxygen and moisture, enhances beneficial solid electrolyte interphase (SEI) layer formation, facilitates efficient multiple cell extractions, and also facilitates the simultaneous addition of electrolyte to multiple cells. The use of $SCCO_2$ also minimizes or eliminates the need for drying after extraction and before activation, and accelerates the extraction process through phase shifting.

BEST MODES FOR CARRYING OUT THE INVENTION

In accordance with the present invention, a fabrication process for a plastic lithium ion battery (PLIB) includes an extraction method combining supercritical fluid extraction and pressure-induced phase-shifting of dense phase gases. The use of supercritical fluids provides for the rapid and efficient penetration of the battery components and solubilization of the materials to be extracted. By applying the SCF using pressure induced phase shifting, the rate of displacement of the extracted materials from the battery components is accelerated and the extraction process is thereby optimized.

Battery cell structures are first formed by methods well known to those of ordinary skill in the art. The anode, cathode, and separator, for example only, may be formed as taught in Gozdz U.S. Pat. No. 5,540,741 incorporated herein by reference. The separate anodic, cathodic, and separator components may be, for example, laminated and compressed together.

The cell anode and cathode preferably contain a polymer such as polyvinylidine fluoride (also known under the tradename of Kynar FLEX), which is available commercially from Atachem North America, for example. The cell components must be extracted to remove plasticizer before impregnation with the electrolyte. In accordance with the present invention, the process is performed using $CO_2$ at 50 to 500 atmospheres and 0 to 100° C., with repeating alternating fluid flow followed by static fluid pressure. The flow period is typically conducted with 1 to 100 cm/minute flow velocities at 80 to 500 atmospheres and 30 to 100° C. for 10 to 60 minutes. The static period is typically performed at 0 to 100° C., 50 to 500 atmospheres for 0.01 to 10 minutes.

Figure 1:
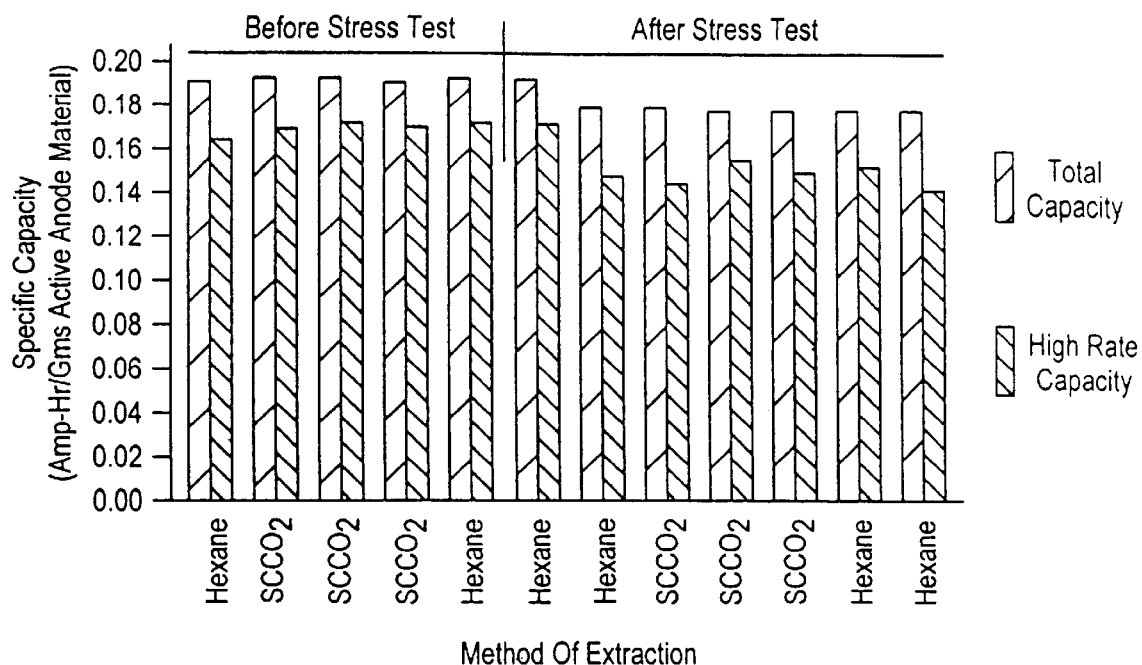
FIG. 1 illustrates signature curve data relative to the performance of the present invention relative to a known process.

As illustrated in FIG. 1, the usefulness of supercritical fluids (SCFs) as extraction solvents has been demonstrated for the removal of plasticizer prior to activation of the preform. In accordance with the present invention, extraction is performed using $CO_2$ at variable pressures (for phase shifting) within the range of 50 to 100 atmospheres, at a fixed temperature selected within the range of 0–100° C., and with repeated alternating periods of fluid flow followed by static fluid pressure. The flow period is typically conducted in the range of 1–100 cm/minute flow velocity, with pressures in the range of 80–500 atmospheres, and at a selected temperature in the 30–100° C. range for about 10–60 minutes. The static period is typically in the pressure range of 50–400 atmospheres at the same selected temperature (30–100° C. range) for about 0.1–10 minutes. The phase shifts caused by pressure change (both down and up) recur in about 0.01–0.1 minutes.

The initial performance of PLIB cells extracted with supercritical carbon dioxide under these conditions is comparable to that of cells extracted with condensed solvents such as hexane. For example, $SCCO_2$ extraction was performed using three repeated alternating periods of flow and static conditions. Solvent flow was performed at 400 atmospheres, 50° C. for 20 minutes, followed by a static period of 0.1 minutes at 150 atmospheres, 50° C. FIG. 1 compares the performance of battery bicells so extracted with those extracted using traditional hexane extraction methods, as determined by evaluating their electrical capacities before and after typical stress test procedures. The phase shift transition times, due to the changes of pressure between 400 and 150 atmospheres were approximately 0.03 minutes. FIG. 1 shows the high rate discharge capacity and total discharge capacities of cells before and after stress testing (change/discharge cycling at 100% DOD and 55° C.) and demonstrates nearly equivalent performance for $SCCO_2$ and hexane processed samples.

In contrast to simply operating under supercritical conditions, the phase of the dense gas is repeatedly shifted from the subcritical or liquid phase to the supercritical phase, and then vice versa, by incrementally varying the pressure. At each step in the pressure change, the dense phase gas possesses different cohesive energy density or solubility properties thereby providing removal of plasticizer and contaminants from the substrate without the necessity of utilizing different solvents.

Unlike the use of traditional solvents, $SCCO_2$ extraction requires high pressure handling systems which are inherently closed systems (i.e. leak-free and airtight). Consequently, control of the environment with the extraction chamber is easily accomplished and readily established and maintained as moisture-free. Once the plasticizer has been extracted with $SCCO_2$, the cell(s) may be simply maintained in the same moisture-free environment until impregnation with electrolyte. In this invention, after extraction and venting carbon dioxide to atmospheric pressure, the extraction chamber is closed off, thereby sealing the hygroscopic cell(s) in a removable chamber which may then be placed in a "dry box" or anhydrous environment for electrolyte impregnation.

Figure 2:
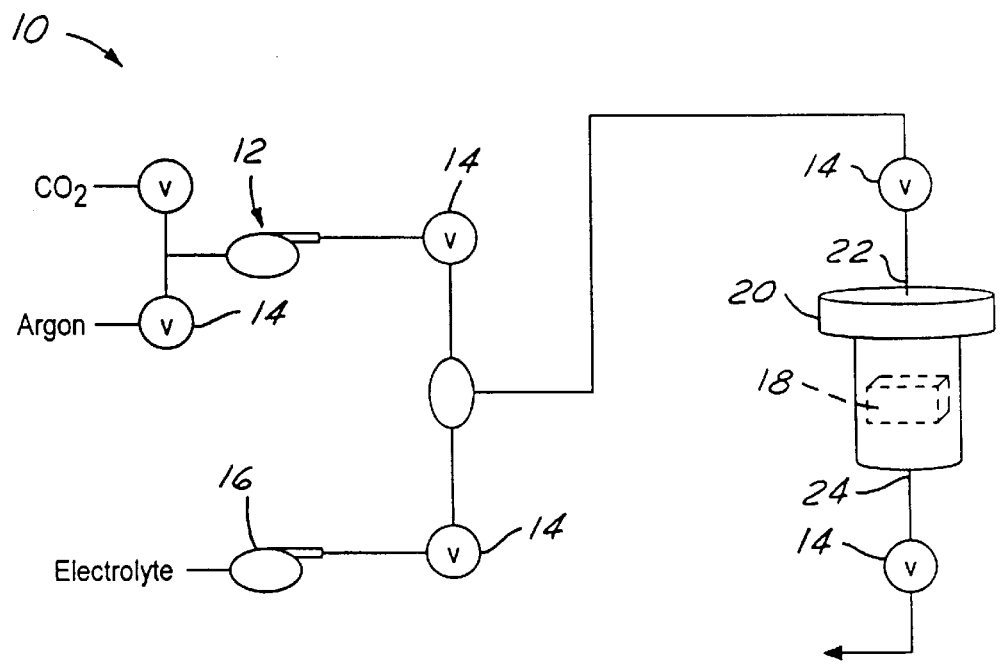
FIG. 2 schematically illustrates a SCF extraction process in accordance with the present invention.

In accordance with the present invention, a leak-free and airtight extraction/activation process 10 is illustrated in FIG. 2. During extraction, the supercritical fluid (SCF) is pumped through a first pump 12 and into the extraction chamber 20 through selective actuation of valves 14. The valves 14 are preferably solenoid valves. An electrolyte is pumped into the system by pump 16. A cell or stack of cells is secured within the extraction chamber 20 for treatment therein. Prior to extraction, the bicell or bicells and the extraction chamber may be purged with argon to remove airborne contaminants and moisture. During extraction, as the SCF (carbon dioxide, for example) is pumped into and out of the chamber 20, and with phase shifting, the carbon dioxide diffuses into the plurality of cells 18 thereby removing plasticizers and other contaminants therein.

Because of the high diffusivity and low surface tension of SCFs, extraction of multiple cells in a single chamber can be readily accomplished using $SCCO_2$. Furthermore, with phase shifting, the extraction process is readily accelerated and made feasible for a multiple cell stack.

Figure 3:
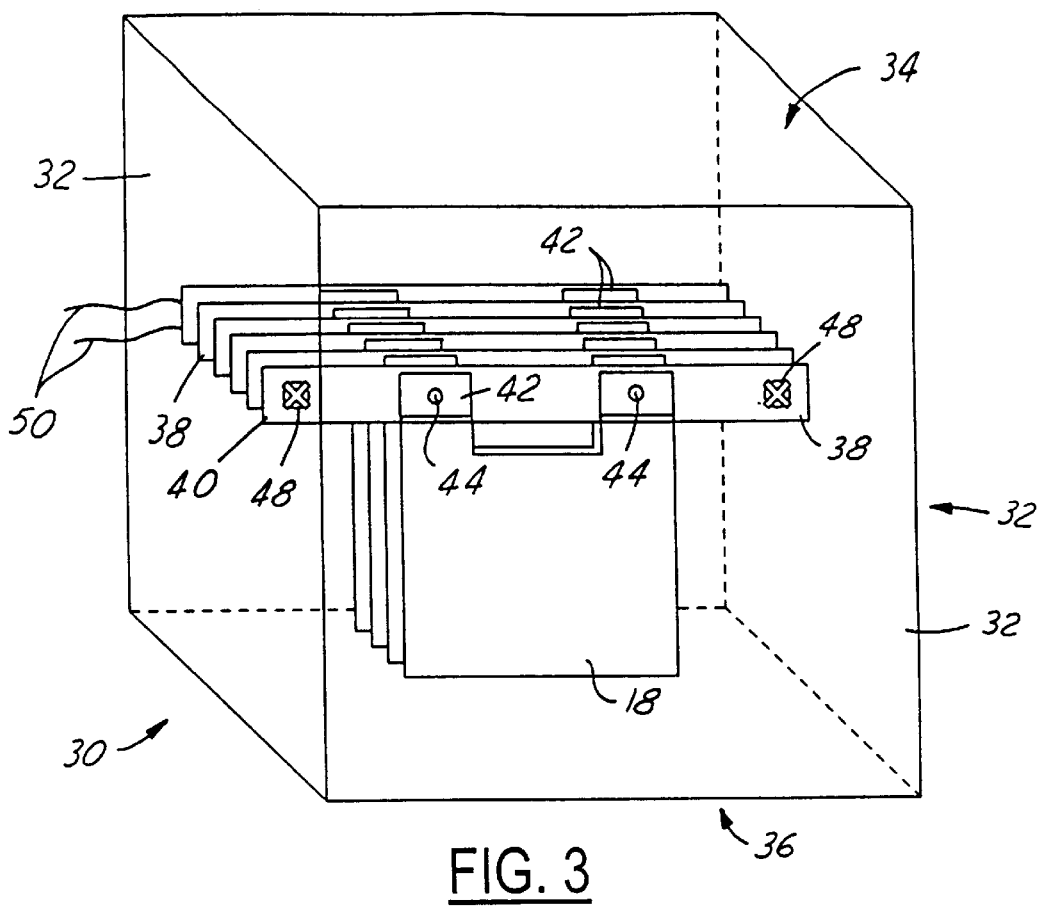
FIG. 3 illustrates a cell fixture assembly in accordance with the present invention.
Figure 4:
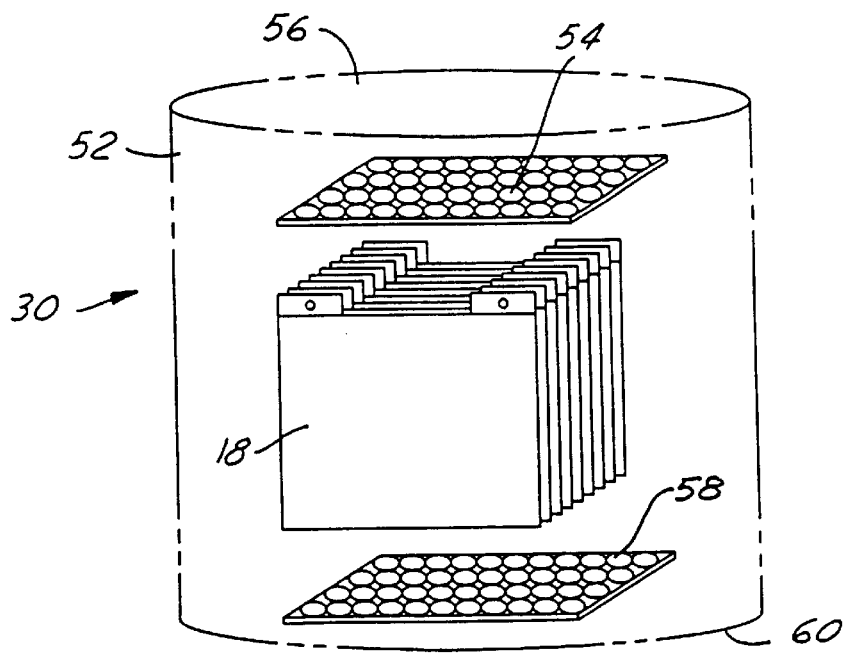
FIG. 4 illustrates a portion of a cell assembly in accordance with the present invention.
Figures 5A, 5B:
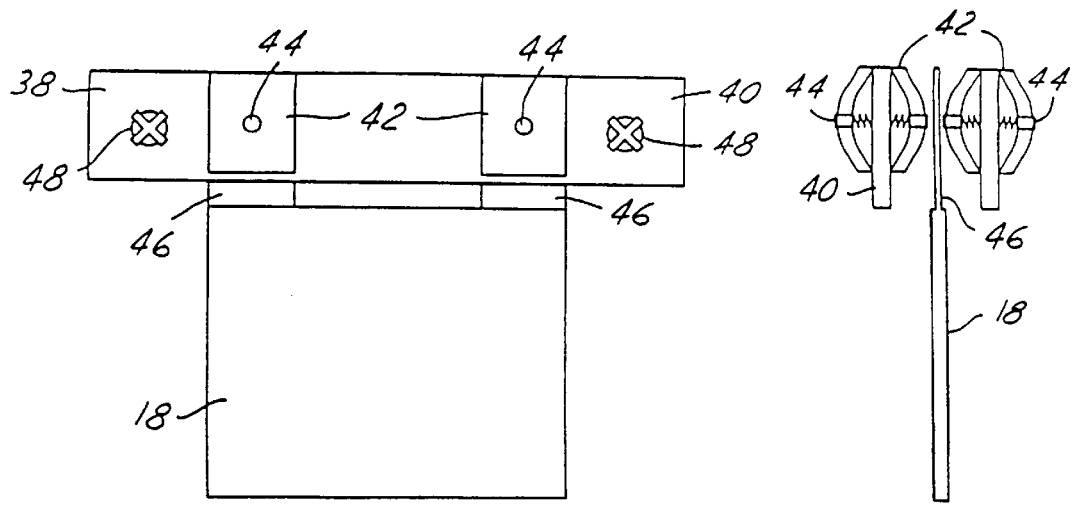
FIGS. 5A and 5B illustrate the clamping head portion of the cell fixture assembly in accordance with the present invention.

The cell fixture assembly 30 shown in FIGS. 3 and 4 illustrates how $SCCO_2$ or other gases are diffused into the plurality of cells 18 for multiple cell extraction. A stack of cells 18 are fixed in parallel orientation. The assembly 30 includes a plurality of lateral sidewalls 32 which enclose the stack of bicells 18. The top 34 and bottom 36 of the extraction assembly 30 are open. As shown in FIGS. 3 and 5, clamping bars 38, each equipped with spring loaded elastomeric clamping heads 40, contain spring loaded electrical contact pads 42. The clamping bars 38 hold the cells 18 in a parallel array. The pads 42 contain electrical contacts 44 which are attached to both sides of the collector tabs 46 of each of the bicells. Hold down screws 48 secure the clamping heads 40 to the assembly 30. The pads 42 provide an electrical connection between the charging lines 50 and the current collectors of the cells 18 and also serve to seal the current collector tabs to prevent electrolyte wetting during the activation steps.

Alternately, if the activation step is to be omitted, the collector tabs for the multiple individual bicells may be clamped together as a group rather than separately, using a single set of clamping bars. The bicell stack is then attached to the extraction assembly with the hold-down screws as described above.

As shown in FIG. 4, the assembled stack of cells 18 is placed within a block 52 that is preferably, but not necessarily, formed from Teflon. A perforated inlet diffuser plate 54 is fixed at a first end 56 of block 52. A perforated outlet diffuser plate 58 is fixed at a second end 60 of block 52.

The assembly 30 fixed within the Teflon block 52 is then placed in the extraction chamber 20 (FIG. 2). The extraction chamber inlet 22 fluidly communicates with the perforated diffuser plate 54. The extraction chamber outlet 24 fluidly communicates with perforated diffuser plate 58. During extraction or activation, the block 52 serves to ensure that the fluids introduced through the diffuser plate 54 flow through rather than around the stack of cells 18, and then out plate 58.

In this invention, pressure variable phase-shifting the SCFs expedites extraction of the PLIB cells by promoting mass transfer and increasing the overall rate of contaminant removal from the part. For mass transport limited extraction processes, the rate of extraction is controlled by diffusion of fluid containing contaminant out of the part. Clean fluid diffuses into the part and dissolves the contaminant(s). Additional clean fluid continues to diffuse into the part mixing with the contaminated fluid, diluting the level of contamination and thereby removing contaminant from the part. Phase shifting accelerates this process by periodically physically displacing contaminated fluid from within the part.

U.S. Pat. No. 5,013,366 to Jackson et al. describes a phase shifting process by which the polarity of solvency of the supercritical fluid may be varied significantly and rapidly by variations in the fluid temperature such that the fluid undergoes a change in phase. Such a phase change usually involves a shift from the supercritical to liquid state (and often back again) to provide removal of a variety of contaminants from the substrate without the necessity of utilizing different solvents. In this manner, a single gas or gas mixture is phase shifted in order to provide a spectrum of solvents which are capable of removing a variety of contaminants. Furthermore, the '366 patent discloses that the desired change in phase is induced by a variation in the temperature of the fluid such that the fluid density increases sufficiently to generate the liquid phase.

The '366 patent also discloses that trapped supercritical fluids within a polymeric material may be displaced by an alternative supercritical fluid. The replacement is performed for the purpose of substituting supercritical fluids which have preferred diffusion properties and is performed at the conclusion of the cleaning process to safely remove clean fluid from the part to prevent damage to the part on depressurization by substituting a fluid which diffuses rapidly and easily from the host material.

Figure 6:
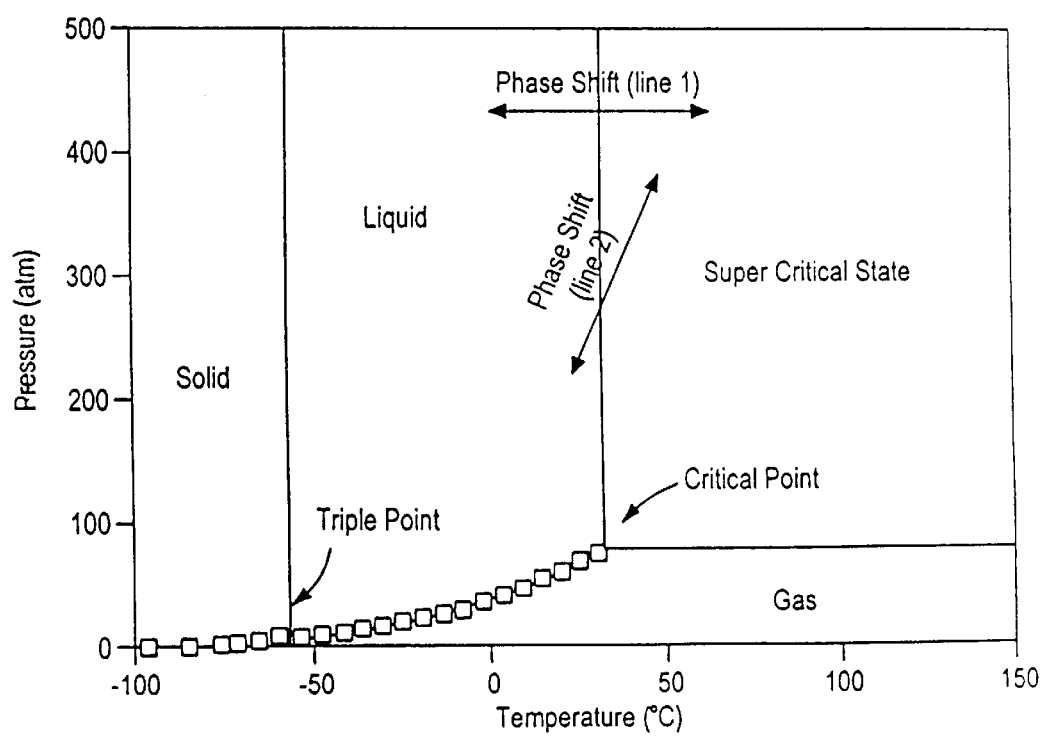
FIG. 6 is a pressure-temperature graph illustrating use of the present invention.

As illustrated in FIG. 6, and as described in the '366 patent, phase shifting (line labeled 1) involves a significant change in temperature of the extracting fluid resulting in its change from a supercritical to liquid state. Contrary thereto, however, phase shifting in the present invention does not alter the solvency power of the fluid, but rather changes its physical properties. Since the properties of a dense fluid are highly sensitive to their parameters of state, a phase shift results in a fluid with dramatically different physical and chemical properties. The present invention does not alter the solvency power of the cleaning fluid. Phase shifting results in the rapid change in the physical properties of the fluid about the battery part, including its density. By shifting from supercritical to liquid phase, an increase in fluid density occurs around the part, creating a fluid density gradient within which is the driving force for fluid displacement from within the part. Furthermore, contrary to the process disclosed in the '366 patent, phase shifting in the present invention is accomplished by controlling fluid pressure rather than temperature. Whereas, while in the '366 patent a phase shift is caused by varying the temperature of the dense gas while maintaining the pressure at a relatively constant level, in the present invention, the required temperature change is accomplished by a change in pressure. By rapidly reducing pressure, the fluid cools and the desired shift in phase thereby occurs.

As also illustrated in FIG. 6, phase shifting (line 2), in accordance with the present invention, usually involves the simultaneous decrease of pressure and temperature of the extracting fluid, resulting in a change from the supercritical to liquid phase. In the first step, pressure is stepped down by expansion of the extraction fluid, causing the brief, rapid displacement of fluid containing contaminants from within the part. With a consequent temperature decrease, a phase change occurs in the fluid. Because of the higher viscosity, lower diffusivity and permeability of the liquid phase, diffusion of contaminant-laden solvent back into the part is negligible, and under flow condition, the part is "washed" free of contaminant. The fluid is then returned to the supercritical state and the process is repeated, resulting in enhanced contaminant removal from within the part interior and therefore an accelerated rate of extraction as compared to an isobaric/isothermal process. The drying steps normally required after the extraction step are thus eliminated.

In another aspect of the invention, the use of $SCCO_2$ as an extraction solvent will have an additional ancillary benefit. When the anode is pretreated with $CO_2$, the formation of a solid electrolyte interphase (SEI) layer including $Li_2CO_3$ has been reported by Hong Gan and Ester S. Takeuchi, in J. Power Sources, 62 (1996) pp. 45–50, the teachings of which are incorporated herein by reference.

The SEI layer improves electrical performance of the anode by maintaining a low ionic resistance due to the formation of preferred carbonates in lieu of less conductive metal organic species formed by reaction between the electrolyte components. The formation of $Li_2CO_3$ is significantly enhanced by elevated $CO_2$ pressure and the applied potential during cell preparation and operation. See Yair Ein Ely and Doron Aurbach, Langmuir, 8 (1992) pp. 1845–1850, also incorporated herein by reference. Although formation of the SEI layer is not clearly understood, it appears to be preceded by the reduction of $CO_2$ at the anode followed by the formation of $Li_2CO_3$ in the electrolyte, which then forms within the anode and on the surface of the particles of the anode.

Finally, in yet another aspect of the invention, the electrolyte absorption/activation step may also be simplified. With SCF extraction as described herein and as illustrated in FIG. 2, electrolyte may be introduced into the extraction chamber by the high pressure fluid handling system directly to the extracted cell without removing it from its extraction chamber. Electrolyte is pumped through pump 16 and into the extraction chamber 20 thereby immersing the cell(s) in electrolyte. In standard electrolyte impregnation procedures, the uptake of electrolyte maximizes after about 10 minutes, but full equilibration typically occurs over a few hours. In contrast, in accordance with the present invention, uniform absorption/dispersion of electrolyte throughout the cell may be accelerated by applying about one to five psi $CO_2$ pressure during the electrolyte absorption step. After a few minutes of equilibrium under static $CO_2$ pressure to allow uniform distribution of the electrolytes throughout the cell(s), the excess electrolyte is then physically displaced from the chamber by a pressure "plug" of $CO_2$ approximately 20–100 psi. After removing the gross excess electrolyte in this manner, the cell is then maintained in the chamber under a slightly positive $CO_2$ pressure (about one to five psi). The chamber is then detached and placed in the dry box, where the cell is removed and freed from any residual excess electrolyte. The cell(s) is then changed through the application of the required formation cycles and further processed in accordance with the current fabrication procedures well known to those of ordinary skill in the art.

In accordance with the SEI aspect of the invention, a $CO_2$ environment is maintained about the cell after extraction, and during the addition of electrolyte and during the charging cycles. As a result, $Li_2CO_3$ formation is encouraged early in the cell formation and maintained during the critical activation cycles. Furthermore, the extraction chamber is saturated with $CO_2$ (about one to five psi) while being filled with electrolyte, and a cell(s) containing electrolyte is held under $CO_2$ pressure of about 14–42 psi (one to three atmospheres) during its formation cycle. Furthermore, the final cell(s) is packaged and sealed under $CO_2$ (14 to 42 psi) to further enhance the formation and maintenance of the SEI layer throughout the life of the cell(s). One of ordinary skill will readily appreciate that the discussion given above applies to single cell manufacturing as well as multicell manufacturing as shown in FIG. 3.

Alternatively, if a complete or precise removal of excess electrolyte from the chambers is not required, the cell(s) may be simply charged in its extraction chamber. Following absorption of the electrolyte, the bulk of the excess electrolyte is displaced from the chamber with $CO_2$ gas as described above and the cell(s) is then charged in place by applying the required formation cycles. Next, the cell(s) is de-gassed in place. The chamber is then removed from the extraction/activation system and placed in the dry box where the cell(s) is further processed in accordance with current fabrication procedures known by those of ordinary skill in the art. The "single pot" approach to fabrication will simplify the critical and complex cell(s) extraction and activation steps, greatly reducing the manual manipulation of the cell(s). This approach also virtually eliminates most of the primary cell contamination sources due to handling during fabrication. Cell contamination may lead to cell failure or unacceptable long-term cell performance.

While the preferred embodiment of the invention has been disclosed, it should be appreciated that the invention is susceptible of modification without departing from the scope of the following claims.

What is claimed is:

1. A method of making a battery comprising:
   forming one or more cells containing plasticizer;
   securing said one or more cells in an airtight leak-free extraction chamber, said chamber in fluid communication with a fluid delivery system;
   contacting the cells with a compressed or dense phase gas consisting essentially of carbon dioxide, said carbon dioxide at a pressure and temperature equal to, above, or below the critical pressure and/or critical temperature of carbon dioxide;
   extracting the cell(s) maintained at a temperature above the critical temperature of carbon dioxide by sequentially flowing compressed or dense phase carbon dioxide extraction solvent and then changing the phase of the carbon dioxide between the supercritical state and the liquid state by varying the pressure of the carbon dioxide in a series of alternating steps between two pressures at or above the critical pressure of carbon dioxide, maintaining said pressure at the completion of each step for a period of time sufficient to remove the plasticizer and/or one or more contaminants, said maintaining contact between said carbon dioxide and said one or more cells for said period of time at each step;
   changing the phase of the carbon dioxide without attempting to minimize or modulate any change in the temperature of the fluid during the phase change;
   varying the temperature of the carbon dioxide by causing a rapid and significant change in pressure of the fluid by either expansion to produce cooling or compression to produce heating of the fluid;
   contacting said one or more cells with an electrolyte;
   applying 15–20 pounds per square inch of static carbon dioxide pressure to said extraction chamber;
   applying and then releasing a static pressure plug of 20–100 pounds per square inch of carbon dioxide pressure to the extraction chamber to remove an excess of said electrolyte; and
   applying 15–20 pounds per square inch of static carbon dioxide pressure to said extraction chamber.

2. The method as set forth in claim 1 further comprising conducting said phase shifting by varying the fluid pressures between 50 to 100 atmospheres, with durations at each condition or step of 0.01 to 60 minutes or more.

3. The method as set forth in claim 1, following the last application of 15–20 pounds per square inch of static carbon dioxide to said extraction chamber, further comprising:
   removing said airtight extraction chamber from said leak-free and airtight fluid delivery system;
   placing said airtight extraction chamber in a dry box for further removal of any residual excess electrolyte;
   charging said one or more cells under a carbon dioxide pressure of about 14–42 pounds per square inch; and
   packaging and sealing said one or more cells under a carbon dioxide pressure of about 14–42 pounds per square inch.

4. The method as set forth in claim 1, following the extraction step, further comprising:
   contacting said one or more cells with an electrolyte;
   applying about 15–20 pounds per square inch of static carbon dioxide pressure to said extraction chamber;
   applying and then releasing a pressure plug 20–100 pounds per square inch of carbon dioxide pressure to said extraction chamber to remove an excess of said electrolyte;

applying about 14–42 pounds per square inch of static carbon dioxide pressure to said extraction chamber;

charging said one or more cells within the extraction chamber; and packaging and sealing said one or more cells under a carbon dioxide pressure of about 14–42 pounds per square inch.

5. The method as set forth in claim 1 further comprising the step of extracting the plasticizer by changing the phase of the carbon dioxide between the liquid state and supercritical state through variations in the pressure of the phase.

6. A method of making a battery comprising:

forming one or more cells containing plasticizer;

securing said one or more cells in an airtight leak-free extraction chamber, said chamber in fluid communication with a fluid delivery system;

contacting the cells with a compressed or dense phase gas consisting essentially of carbon dioxide, said carbon dioxide at a pressure and temperature equal to, above, or below the critical pressure and/or critical temperature of carbon dioxide;

extracting the cell(s) by sequentially flowing compressed or dense phase carbon dioxide extraction solvent and then changing the phase of the carbon dioxide between the liquid state and the supercritical state by varying the temperature of the carbon dioxide in a series of steps between a temperature at above the critical temperature of carbon dioxide and a temperature below the critical temperature of carbon dioxide, maintaining said temperature at the completion of each step for a period of time sufficient to remove the plasticizer and/or one or more contaminants, said maintaining contact between said carbon dioxide and said one or more cells for said period of time at each step;

changing the phase of the carbon dioxide without attempting to minimize or modulate any change in the pressure of the fluid during the phase change;

varying the temperature of the carbon dioxide by causing a rapid and significant change in pressure of the fluid by either expansion to produce cooling or compression to produce heating of the fluid;

contacting said one or more cells with an electrolyte;

applying 15–20 pounds per square inch of static carbon dioxide pressure to said extraction chamber;

applying and then releasing a static pressure plug of 20–100 pounds per square inch of carbon dioxide pressure to the extraction chamber to remove an excess of said electrolyte; and applying 15–20 pounds per square inch of static carbon dioxide pressure to said extraction chamber.

7. The method as set forth in claim 6, following the last application of 15–20 pounds per square inch of static carbon dioxide to said extraction chamber, further comprising:

removing said airtight extraction chamber from said leak-free and airtight fluid delivery system;

placing said airtight extraction chamber in a dry box for further removal of any residual excess electrolyte;

charging said one or more cells under a carbon dioxide pressure of about 14–42 pounds per square inch; and packaging and sealing said one or more cells under a carbon dioxide pressure of about 14–42 pounds per square inch.

8. The method as set forth in claim 6, following the extraction step, further comprising:

contacting said one or more cells with an electrolyte;

applying about 15–20 pounds per square inch of static carbon dioxide pressure to said extraction chamber;

applying and then releasing a pressure plug of 20–100 pounds per square inch of carbon dioxide pressure to said extraction chamber to remove an excess of said electrolyte;

charging said one or more cells within the extraction chamber; and packaging and sealing said one or more cells under a carbon dioxide pressure of about 14–42 pounds per square inch.

\* \* \* \* \*